(12) United States Patent
Hasegawa et al.

(10) Patent No.: US 8,265,471 B2
(45) Date of Patent: Sep. 11, 2012

(54) LENS BARREL AND IMAGING DEVICE

(75) Inventors: Atsushi Hasegawa, Osaka (JP); Tetsuya Uno, Osaka (JP)

(73) Assignee: Panasonic Corporation, Osaka (JP)

( * ) Notice: Subject to any disclaimer, the term of this patent is extended or adjusted under 35 U.S.C. 154(b) by 98 days.

(21) Appl. No.: 12/835,748

(22) Filed: Jul. 14, 2010

(65) Prior Publication Data
US 2011/0019987 A1    Jan. 27, 2011

(30) Foreign Application Priority Data
Jul. 24, 2009  (JP) ................. 2009-172702

(51) Int. Cl.
*G03B 17/00* (2006.01)
(52) U.S. Cl. .................... 396/72; 396/349; 403/167
(58) Field of Classification Search .............. 396/72, 396/349; 403/167, 263
See application file for complete search history.

(56) References Cited

U.S. PATENT DOCUMENTS

| | | | |
|---|---|---|---|
| 3,680,897 A * | 8/1972 | Linthout | 403/167 |
| 4,118,134 A * | 10/1978 | Mansel | 403/282 |
| 4,484,429 A * | 11/1984 | Stephenson | 52/655.2 |
| 5,579,568 A * | 12/1996 | Hudson et al. | 29/509 |
| 7,016,121 B2 * | 3/2006 | Kawanabe et al. | 359/694 |
| 7,289,725 B2 * | 10/2007 | Nomura | 396/73 |
| 7,660,053 B2 * | 2/2010 | Naitou | 359/819 |
| 7,952,815 B2 * | 5/2011 | Sasaki | 359/700 |
| 2006/0045517 A1 * | 3/2006 | Kato | 396/349 |
| 2007/0177046 A1 * | 8/2007 | Makii | 348/335 |
| 2008/0180812 A1 | 7/2008 | Honsho et al. | |

FOREIGN PATENT DOCUMENTS

| | | |
|---|---|---|
| JP | H10-136607 A | 5/1998 |
| JP | H11-072683 A | 3/1999 |
| JP | 2007-004030 A | 1/2007 |
| JP | 2008-185786 A | 8/2008 |
| JP | 2008-209647 A | 9/2008 |

* cited by examiner

*Primary Examiner* — Clayton E Laballe
*Assistant Examiner* — Leon W Rhodes, Jr.
(74) *Attorney, Agent, or Firm* — Shinjyu Global IP (57) ABSTRACT

The lens barrel includes a first supporting frame, an optical element, a second supporting frame, and a guide shaft. The first supporting frame has a first base portion and a first seat portion that projects in a first direction from the first base portion. The second supporting frame supports the optical element and has a first bearing portion. The guide shaft is coupled to the first seat portion and inserted into the first bearing portion. The first seat portion is disposed within the circumference of the guide shaft when viewed in the first direction.

27 Claims, 11 Drawing Sheets

LENS BARREL AND IMAGING DEVICE

CROSS-REFERENCE TO RELATED APPLICATIONS

This application claims priority under 35 U.S.C. §119 to Japanese Patent Application No. 2009-172702 filed on Jul. 24, 2009. The entire disclosure of Japanese Patent Application No. 2009-172702 is hereby incorporated herein by reference.

BACKGROUND

1. Technical Field

The technology disclosed herein relates to an imaging device and a lens barrel used with the imaging device.

2. Background Information

Imaging devices that make use of a CCD (charge coupled device) sensor, a CMOS (complementary metal-oxide semiconductor) sensor, or another such imaging sensor have become extremely popular in recent years. Examples of such imaging devices include digital still cameras and digital video cameras. These imaging devices are generally equipped with a lens barrel for forming an optical image of a subject on an imaging element. The type of lens barrel generally used is a telescoping lens barrel, which is usually stored inside the camera body when not being used to form an optical image of the subject.

SUMMARY

One aspect of the technology disclosed herein is a lens barrel that comprises a first supporting frame, a second supporting frame, and a guide shaft. The first supporting frame includes a first base portion and a first seat portion that projects from the first base portion in a first direction. The second supporting frame is configured to support an optical element and includes a first bearing portion. The guide shaft is coupled to the first seat portion and inserted into the first bearing portion. When viewed in the first direction, the first seat portion is disposed within the outer circumference of the guide shaft.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The phrase "within the range of the outer shape of the guide shaft" means "within the outline of the guide shaft when viewed in the first direction". The phrase "the first base portion is disposed within the range of the outer shape of the guide shaft" encompasses that the outer shape of the first base portion coincides with the outer shape of the guide shaft.

Configuration of Digital Camera

Figure 1:
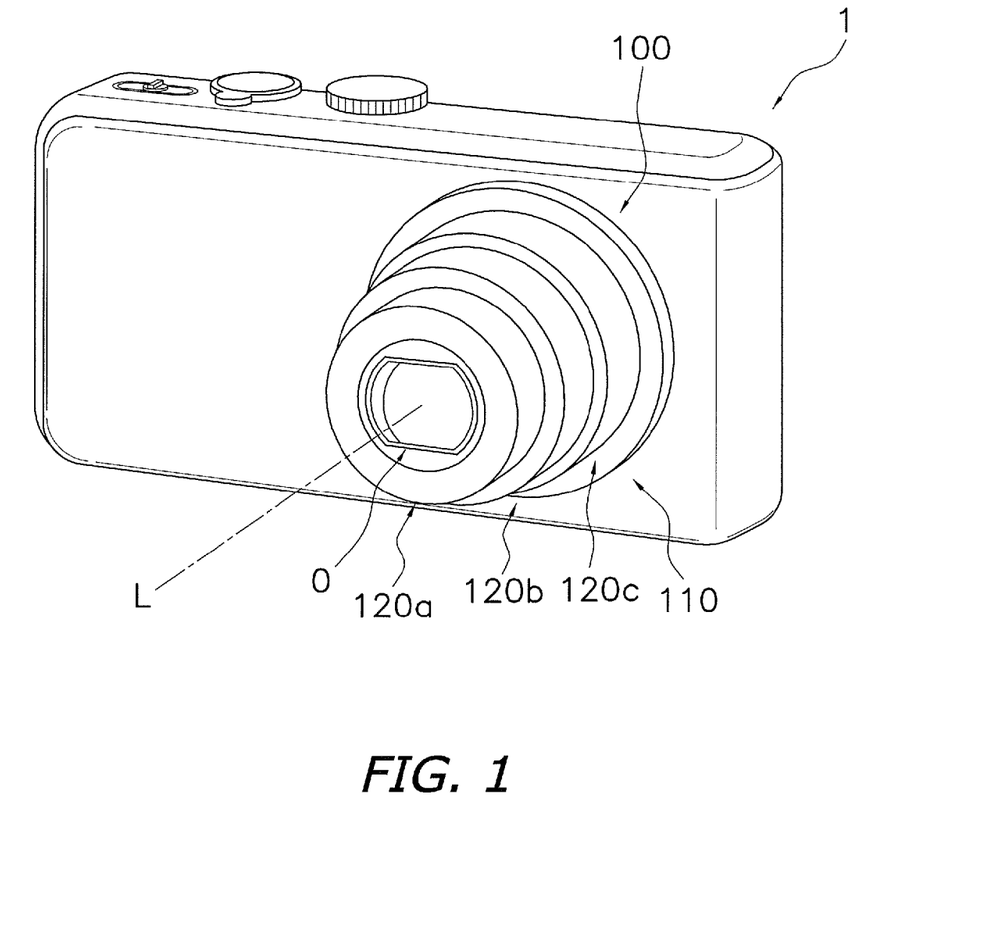
FIG. 1 is an oblique view of a digital camera.

As shown in FIG. 1, a lens barrel 100 (an example of a lens barrel) is mounted on a digital camera 1 (an example of an imaging device). Examples of imaging devices include digital still camera and digital video cameras that make use of an imaging element. Examples of imaging elements include CCD image sensors and CMOS image sensors.

Overall Configuration of Lens Barrel

Figure 2:
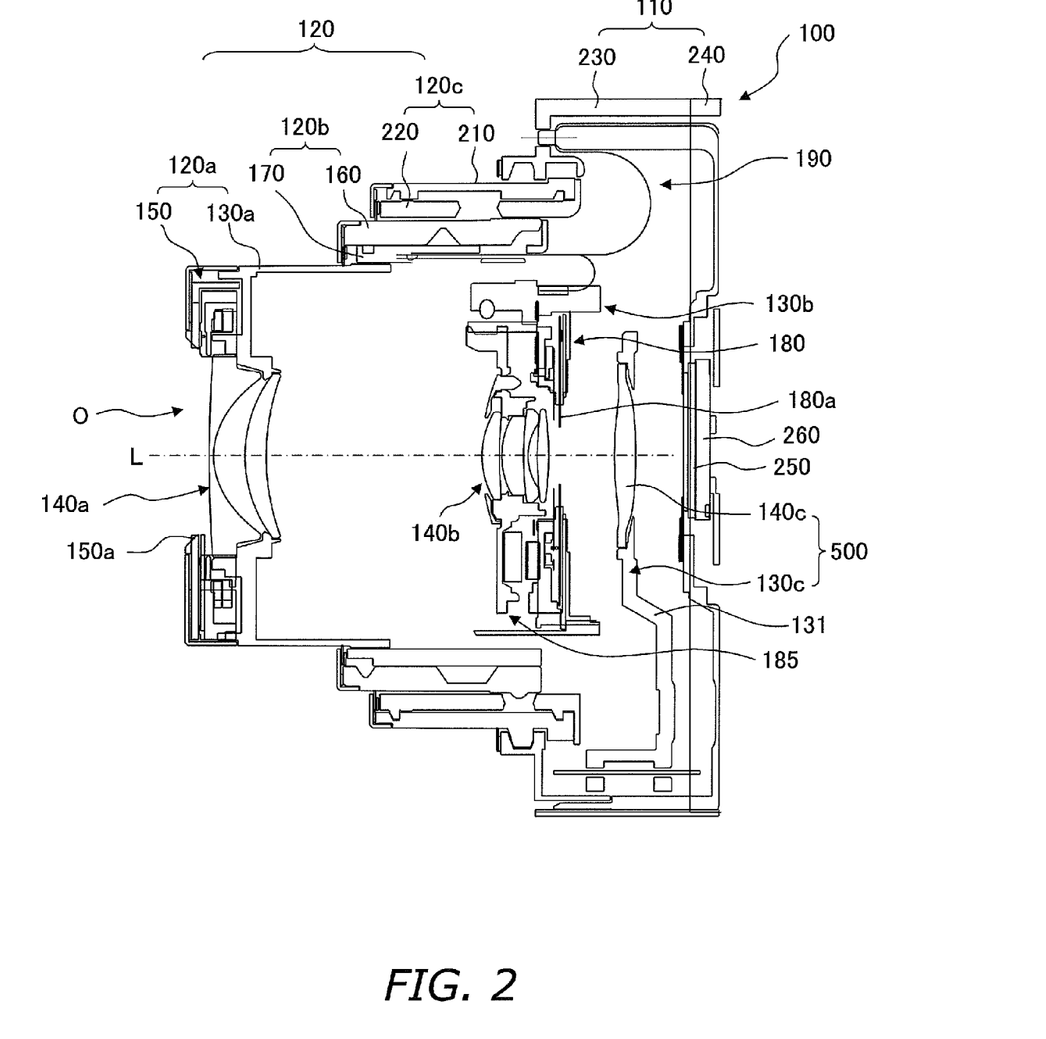
FIG. 2 is a cross section of a lens barrel (wide angle end)
Figure 3:
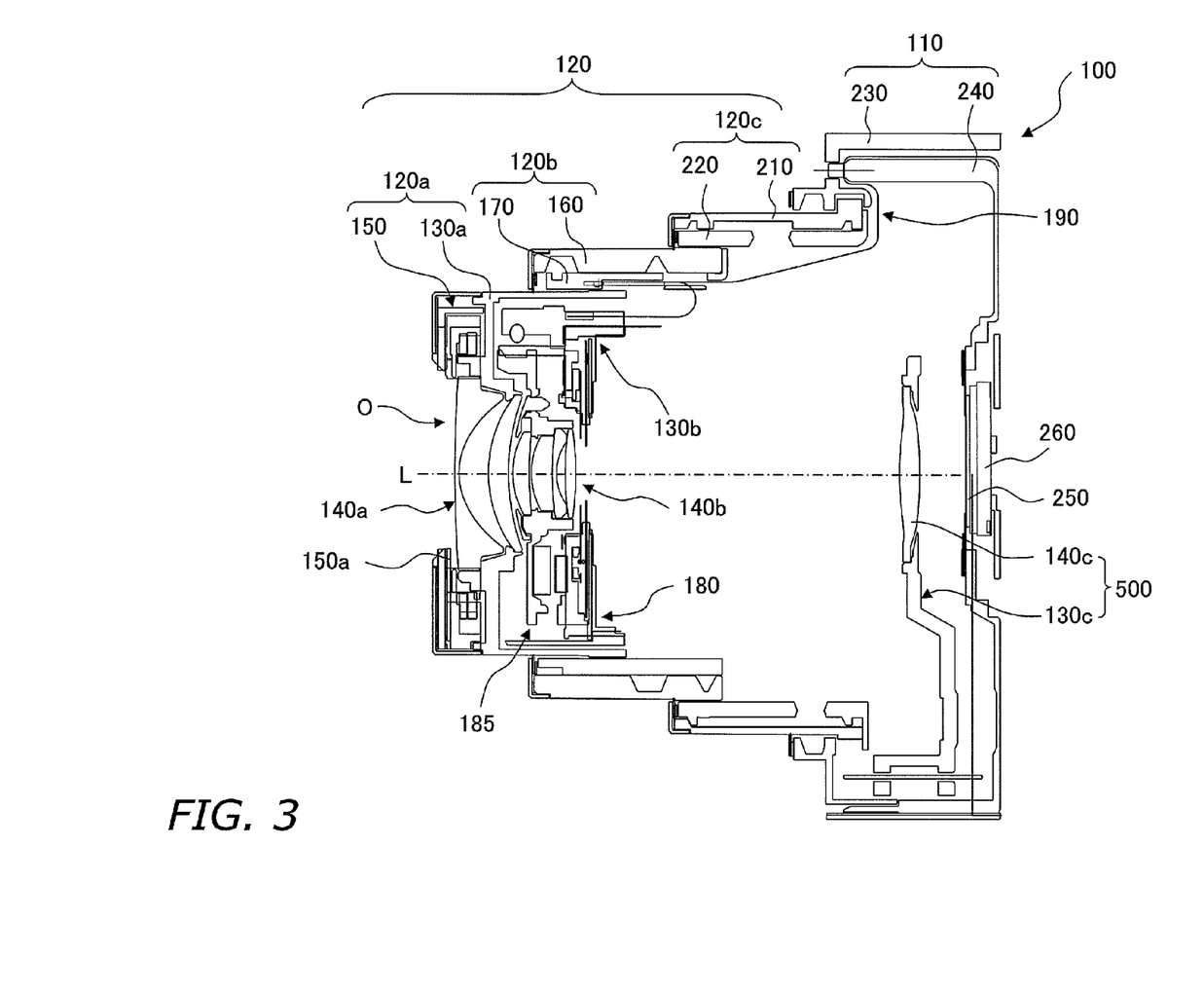
FIG. 3 is a cross section of a lens barrel (telephoto end)
Figure 4:
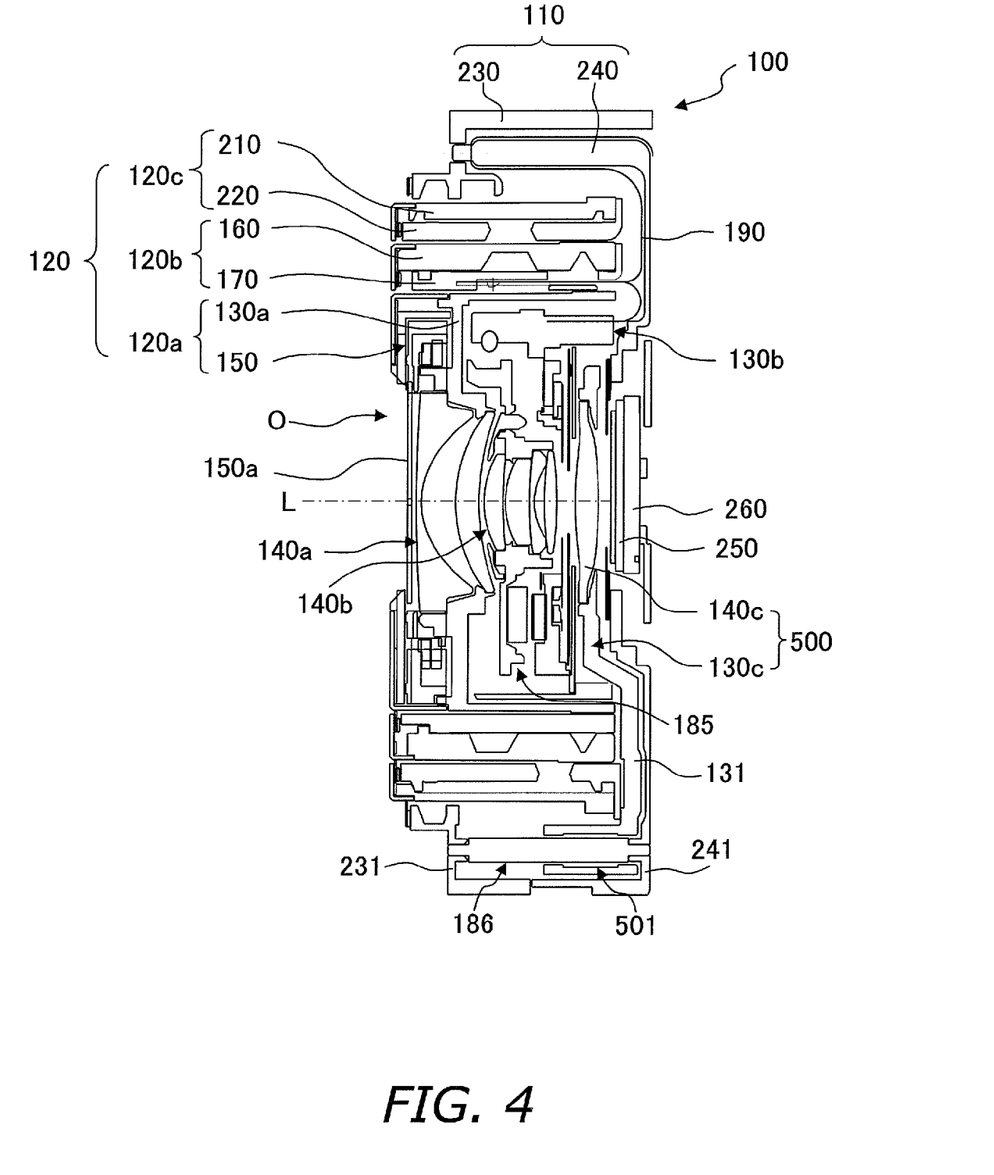
FIG. 4 is a cross section of a lens barrel (when retracted)

The overall configuration of the lens barrel 100 will be described. As shown in FIGS. 2 to 4, the lens barrel 100 comprises an optical system O, a fixed lens barrel 110 (an example of a first supporting frame), a moving lens barrel 120 disposed inside the fixed lens barrel 110, and a CCD unit 260 (an example of an imaging element).

The optical system O has a first lens group 140a, a second lens group 140b, and a third lens group 140c. The optical system O also an optical axis L defined by these lens groups. A direction parallel to the optical axis L will hereinafter also be called the optical axis direction. The optical axis direction is an example of a first direction.

The first to third lens groups 140a to 140c each is made up of a plurality of lenses. However, the first to third lens groups 140a to 140c may instead each is made up of a single lens. The first lens group 140a is a lens group for taking in an optical image of a subject. The second lens group 140b is used for zoom adjustment. The third lens group 140c is used for focus adjustment. The zoom and focus are adjusted by changing the spacing between the first to third lens groups 140a to 140c.

The moving lens barrel 120 is deployed forward (toward the subject) with respect to the fixed lens barrel 110, and stowed inside the fixed lens barrel 110. More specifically, the moving lens barrel 120 has a first moving lens barrel 120a, a second moving lens barrel 120b, a third moving lens barrel 120c, and a second lens frame 130b (an example of a second supporting frame).

The second moving lens barrel 120b is disposed inside the third moving lens barrel 120c, and the first moving lens barrel 120a is disposed inside the second moving lens barrel 120b. During imaging, the second moving lens barrel 120b is deployed with respect to the third moving lens barrel 120c, and the first moving lens barrel 120a is deployed with respect to the second moving lens barrel 120b. During retraction, the second moving lens barrel 120b is stowed in the third moving lens barrel 120c, and the first moving lens barrel 120a is stowed in the second moving lens barrel 120b. Thus, the first to third moving lens barrels 120a to 120c are deployed forward with respect to the fixed lens barrel 110, or are stowed in the fixed lens barrel 110. When the first to third moving lens barrels 120a to 120c have been deployed forward, the first moving lens barrel 120a is deployed at the very front.

Detailed Configuration of Lens Barrel

The lens barrel 100 will now be described in detail.

As shown in FIGS. 2 to 4, the fixed lens barrel 110 has a cylindrical fixing frame 230 and a master flange 240 that is fixed to this fixing frame 230. The third moving lens barrel 120c is disposed inside the fixing frame 230 to be movable in the optical axis direction. A third lens frame 130c is supported by the fixing lens barrel 110 to be movable in the optical axis direction. The CCD unit 260 (an example of an imaging element) and an IR-filtering glass 250 for blocking out infrared rays are disposed at a central part of the master flange 240.

As shown in FIGS. 2 to 4, the first moving lens barrel 120*a* has a first lens frame 130*a* and a barrier unit 150 for protecting the first lens group 140*a*. The first lens group 140*a* is fixed to the first lens frame 130*a*. The barrier unit 150 is disposed on the front (on the subject side) of the first lens frame 130*a*. The barrier unit 150 has a plurality of barrier blades 150*a*. During imaging, the barrier blades 150*a* open and allow light to be incident on the first lens group 140*a* (see FIGS. 2 and 3, for example). At other times (that is, when the lens barrel is retracted), the barrier blades 150*a* close, and the first lens group 140*a* is protected by the barrier blades 150*a* (see FIG. 4, for example).

As shown in FIGS. 2 to 4, the second moving lens barrel 120*b* has a cylindrical camera cam frame 160 and a cylindrical rectilinear frame 170 disposed inside the camera cam frame 160. The first moving lens barrel 120*a* is disposed inside the rectilinear frame 170 movably in the optical axis direction. The first moving lens barrel 120*a* and the second lens frame 130*b* are supported by the second moving lens barrel 120*b* movably in the optical axis direction. More specifically, a cam groove is formed in the inner peripheral face of the camera cam frame 160. This cam groove guides the first lens frame 130*a* and the second lens frame 130*b* in the optical axis direction. As a result, the first lens group 140*a* and the second lens group 140*b* move in the optical axis direction according to the shape of the cam groove. A rectilinear groove is formed in the rectilinear frame 170. This rectilinear frame 170 causes the first lens group 140*a* and the second lens group 140*b* to move in the optical axis direction without rotating with respect to the fixed lens barrel 110.

As shown in FIGS. 2 to 4, the third moving lens barrel 120*c* has a cylindrical drive frame 210 and a cam through-frame 220 disposed inside the drive frame 210. The second moving lens barrel 120*b* is disposed inside the cam through-frame 220 movably in the optical axis direction.

As shown in FIGS. 2 to 4, a shutter unit 180, a shake correcting mechanism 185, and a stop mechanism (not shown) are attached, for example, to the second lens frame 130*b*. The shutter unit 180 has a shutter 180*a* disposed to the rear of the second lens group 140*b*. The shake correcting mechanism 185 supports the second lens group 140*b* movably within a plane perpendicular to the optical axis L. It could also be said that the second lens group 140*b* is supported by the second lens frame 130*b*. The stop mechanism adjusts the aperture of the optical system O. Control signals from a controller (not shown) are transmitted via flexible wiring 190 to the shutter unit 180, the shake correcting mechanism 185, and the stop mechanism.

Detailed Configuration of Third Lens Group Unit

The detailed configuration of the third lens group unit 500 will now be described through reference to FIGS. 4 to 6.

The third lens group unit 500 has a third lens group 140*c* (an example of an optical element) and a third lens frame 130*c*. The third lens group 140*c* is a lens used for focal adjustment, and is fixed to the third lens frame 130*c*. The third lens group unit 500 is supported by the fixed lens barrel 110 movably in the optical axis direction. More specifically, the fixed lens barrel 110 has a master flange 240, a fixing frame 230, and a guide shaft 186. A stepping motor 502 for driving the third lens group 140*c* in the optical axis direction is fixed to the master flange 240.

The third lens frame 130*c* is supported by the fixed lens barrel 110 movably in the optical axis direction. The third lens frame 130*c* has a main body 131 and a guide portion 501.

The main body 131 supports the third lens group 140*c*. The third lens group 140*c* is fixed to the main body 131.

The guide portion 501 is disposed slidably with the guide shaft 186 (an example of a guide shaft; discussed below), and is fixed to the main body 131. In this embodiment, the guide portion 501 and the main body 131 are integrally molded from a resin or the like.

Figure 7:
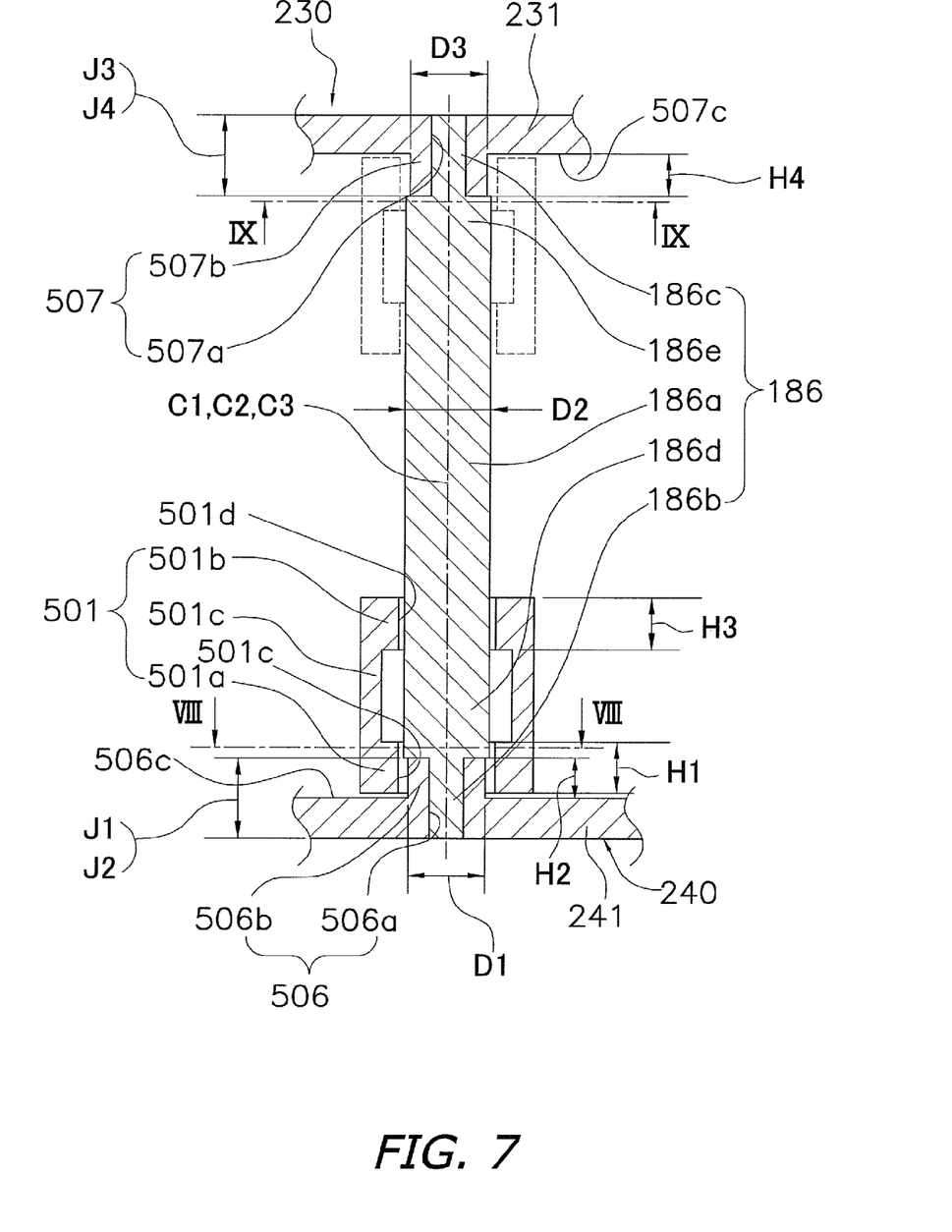
FIG. 7 is a cross section of a guide shaft and its surroundings.

As shown in FIG. 7, the guide portion 501 is a substantially cylindrical member, and the guide shaft 186 is inserted into the guide portion 501. The guide portion 501 has a first bearing portion 501*a* (an example of a first bearing portion), a second bearing portion 501*b* (an example of a second bearing portion), and an intermediate portion 501*e*.

The first bearing portion 501*a* is a substantially tubular portion, and is disposed integrally and movably in the optical axis direction with the main body 131. The first bearing portion 501*a* has a first sliding hole 501*c* (an example of a first sliding hole) disposed slidably with the guide shaft 186. The guide shaft 186 is inserted into the first sliding hole 501*c*. The size H1 of the first bearing portion 501*a* in the optical axis direction (the size of the first sliding hole 501*c* in the optical axis direction) is set to be greater than the size H2 of a first seat portion 506*b* (discussed below) in the optical axis direction.

The second bearing portion 501*b* is a substantially cylindrical member, and is disposed integrally and movably in the optical axis direction with the main body 131 and the first bearing portion 501*a*. The second bearing portion 501*b* has a second sliding hole 501*d* (an example of a second sliding hole) disposed slidably with the guide shaft 186. The guide shaft 186 is inserted into the second sliding hole 501*d*. The size H3 of the second bearing portion 501*b* in the optical axis direction (the size of the second sliding hole 501*d* in the optical axis direction) is set to be greater than the size H4 of a second seat portion 507*b* in the optical axis direction.

The second bearing portion 501*b* is disposed at a position closer to the second seat portion 507*b* than the first bearing portion 501*a*. The first bearing portion 501*a* and the second bearing portion 501*b* are disposed spaced apart in the optical axis direction, and are linked by the intermediate portion 501*e*. The inside diameter of the first bearing portion 501*a* and the second bearing portion 501*b* is smaller than the inside diameter of the intermediate portion 501*e*, so the intermediate portion 501*e* does not slide with the guide shaft 186.

The master flange 240 has a plate portion 241 (an example of a first base portion) and the first seat portion 506*b* (an example of a first seat portion). The plate portion 241 and the first seat portion 506*b* are integrally molded from a resin or the like. The first seat portion 506*b* protrudes in the optical axis direction from the plate portion 241. More precisely, the first seat portion 506*b* protrudes from a first limiting face 506*c* of the plate portion 241 toward the second seat portion 507*b*. A first support hole 506*a* (an example of a first support hole) is formed in the first seat portion 506*b* and the plate portion 241. In this embodiment, the first support hole 506*a* passes through the first seat portion 506*b* and the plate portion 241 in the optical axis direction. Since the first support hole 506*a* is formed in the first seat portion 506*b*, the first seat portion 506*b* has a hollow cylindrical shape.

Figure 5:
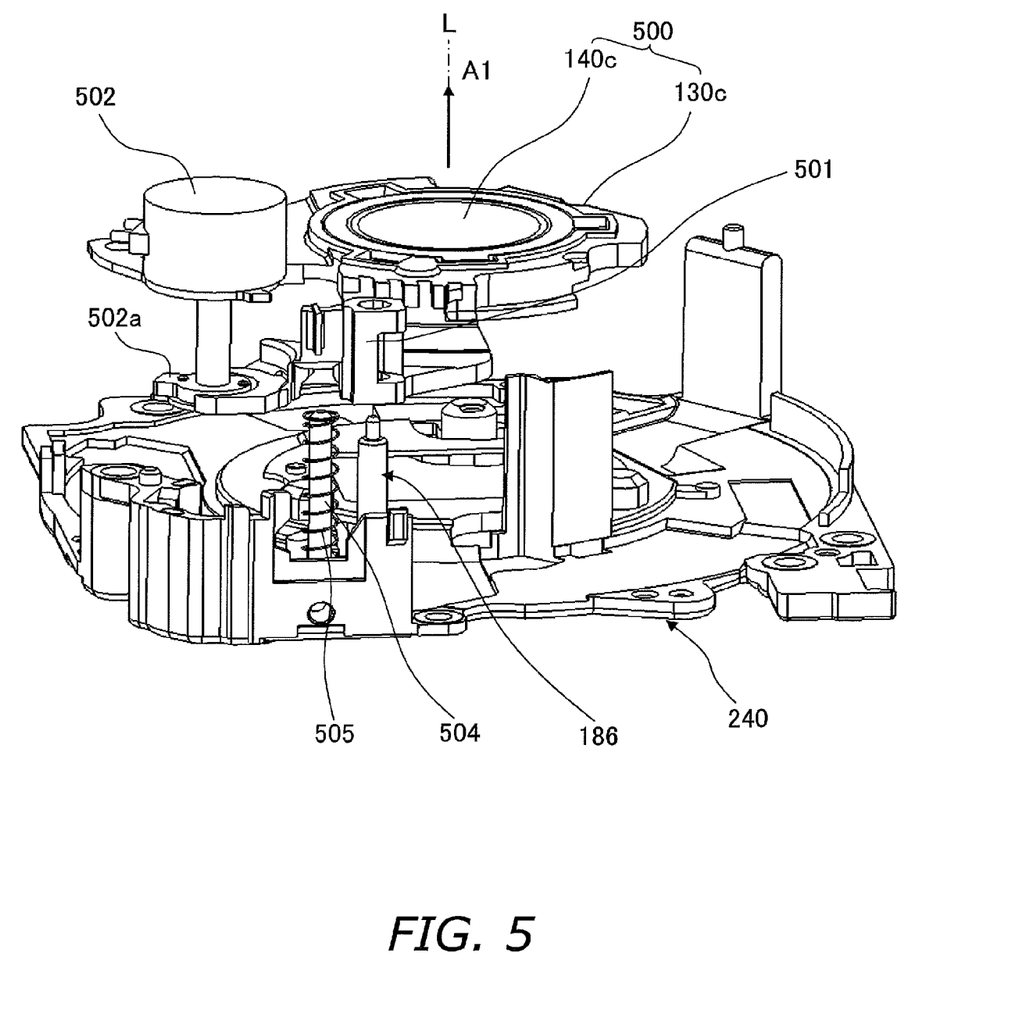
FIG. 5 is an exploded oblique view of a master flange and a third lens group unit.
Figure 6:
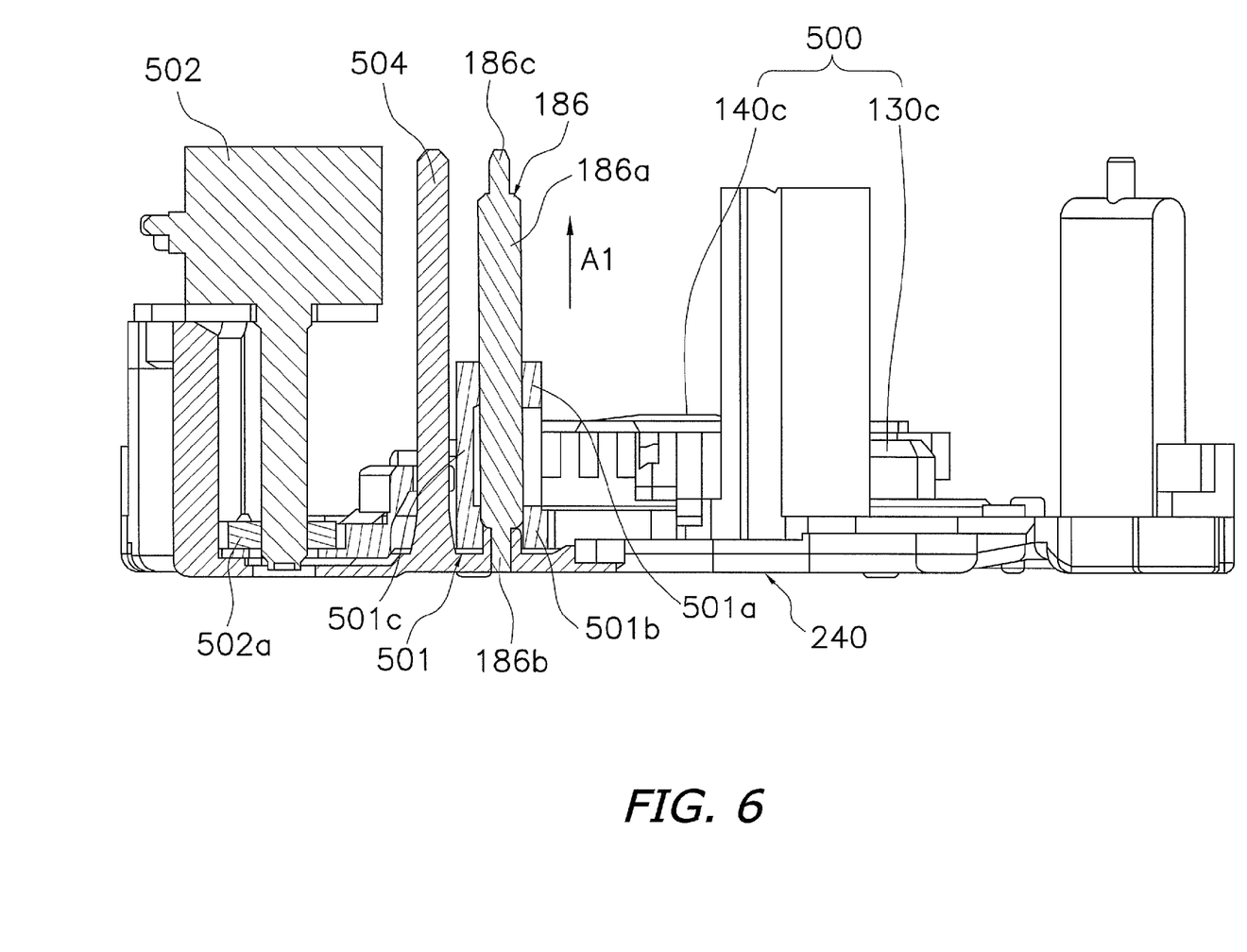
FIG. 6 is a cross section of a master flange and a third lens group unit.

As shown in FIGS. 5 and 6, the master flange 240 has a spring guide 504. A spring 505 is mounted to the spring guide 504. The third lens frame 130*c* is constantly pushed in a direction A1 by the spring 505. The third lens frame 130*c* comes into contact with a drive member 502*a* mounted to the rotary shaft of the stepping motor 502. The third lens frame 130c is pressed against the drive member 502a by the spring 505. When the stepping motor 502 drives the drive member 502a in the optical axis direction, the third lens frame 130c moves along with the drive member 502a in the optical axis direction with respect to the master flange 240.

Meanwhile, as shown in FIG. 7, the fixing frame 230 has an annular portion 231 (an example of a second base portion) and the second seat portion 507b (an example of a second seat portion). The annular portion 231 and the second seat portion 507b are integrally molded from a resin or the like. The annular portion 231 is disposed spaced apart from the master flange 240 in the optical axis direction. A space in which the third lens frame 130c moves is formed between the annular portion 231 and the plate portion 241.

The second seat portion 507b protrudes in the optical axis direction from the annular portion 231. More specifically, the second seat portion 507b protrudes from the annular portion 231 (more precisely, from a second limiting face 507c of the annular portion 231) toward the first seat portion 506b in the optical axis direction, and is disposed spaced apart from the first seat portion 506b in the optical axis direction. A second support hole 507a is formed in the second seat portion 507b and the annular portion 231. In this embodiment, the second support hole 507a goes through the second seat portion 507b and the annular portion 231 in the optical axis direction. Since the second support hole 507a is formed in the second seat portion 507b, the second seat portion 507b has a hollow cylindrical shape.

As shown in FIG. 7, the guide shaft 186 is a member for guiding the third lens frame 130c in the optical axis direction, and is fixed to the fixing frame 230 and the master flange 240. The guide shaft 186 is inserted into the guide portion 501 (the first bearing portion 501a and the second bearing portion 501b). The guide shaft 186 is made of metal, for example.

The two ends of the guide shaft 186 are fixed to the first seat portion 506b and the second seat portion 507b, respectively. The guide shaft 186 has a shaft main body 186a (an example of a shaft main body), a first fixed portion 186b (an example of a first fixed portion), and a second fixed portion 186c (an example of a second fixed portion).

The shaft main body 186a is a solid cylindrical portion extending in a slender shape in the optical axis direction, and is disposed between the first seat portion 506b and the second seat portion 507b. The shaft main body 186a has a first end 186d and a second end 186e. The first end 186d comes into contact with the first seat portion 506b in the optical axis direction. The second end 186e comes into contact with the second seat portion 507b in the optical axis direction. The shaft main body 186a is inserted into the first bearing portion 501a and the second bearing portion 501b, and is disposed slidably with the first bearing portion 501a and the second bearing portion 501b.

The first fixed portion 186b protrudes in the optical axis direction from the first end 186d, and is a solid cylindrical portion that is more slender than the shaft main body 186a. The first fixed portion 186b is inserted into the first support hole 506a, and is press-fitted and fixed to the first seat portion 506b. The size J1 of the first fixed portion 186b in the optical axis direction is substantially the same as the size J2 of the first support hole 506a in the optical axis direction.

The second fixed portion 186c protrudes in the optical axis direction from the second end 186e of the shaft main body 186a, and is a solid cylindrical portion that is more slender than the shaft main body 186a. The second fixed portion 186c is inserted into the second support hole 507a, and is press-fitted and fixed to the second seat portion 507b. The size J3 of the second fixed portion 186c in the optical axis direction is substantially the same as the size J4 of the second support hole 507a in the optical axis direction.

Figure 8:
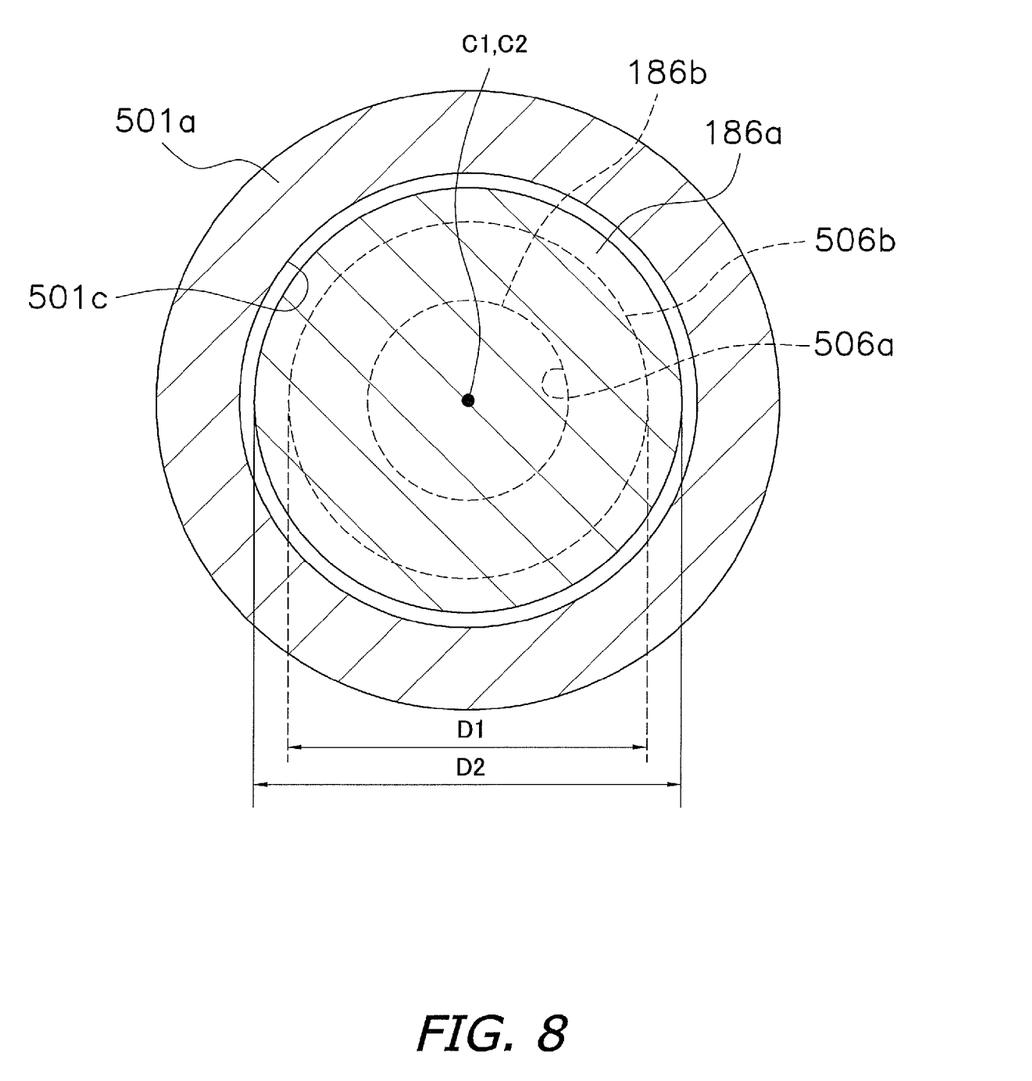
FIG. 8 is a cross section along the line in FIG. 7.
Figure 9:
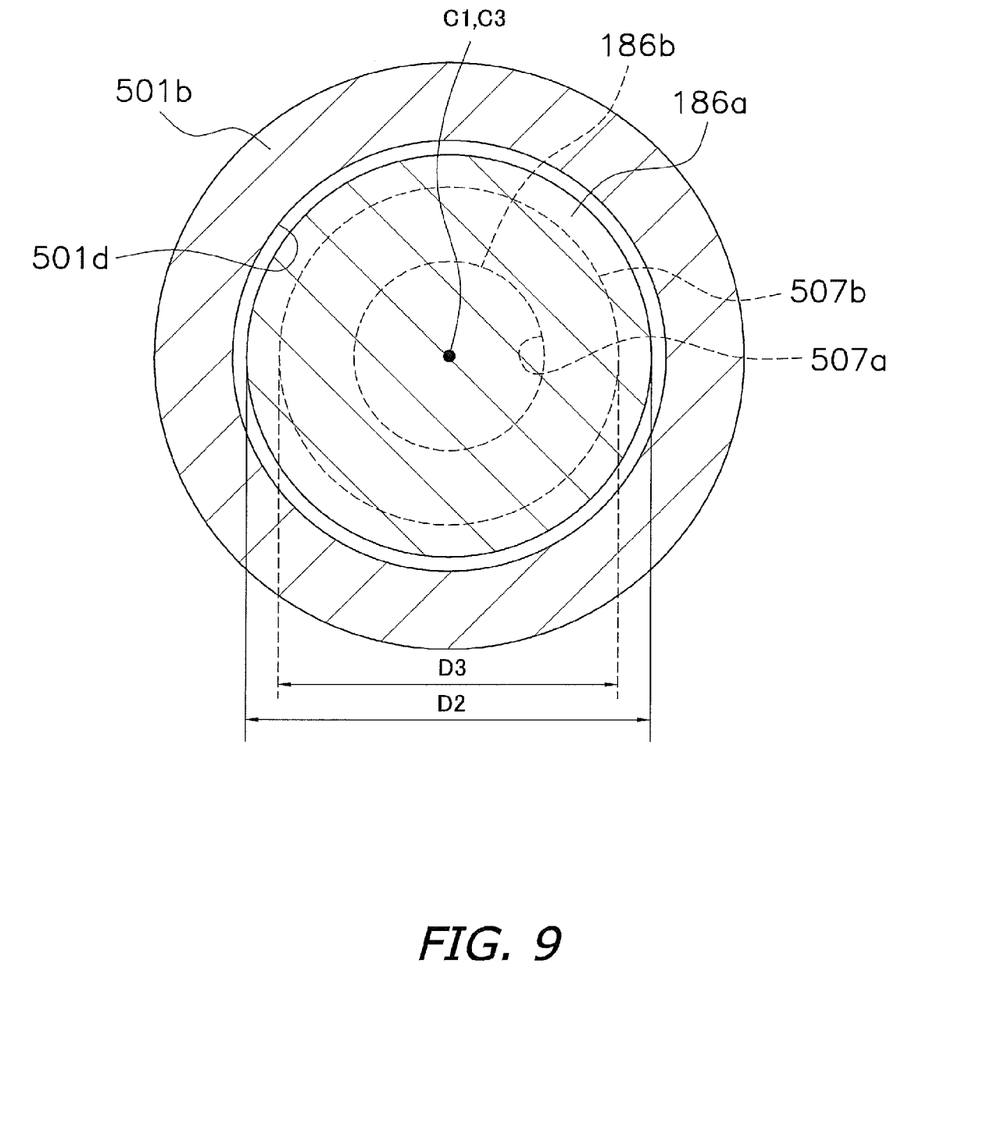
FIG. 9 is a cross section along the IX-IX line in FIG. 7.

As shown in FIGS. 7 to 9, the outside diameter D1 of the first seat portion 506b (an example of the maximum outer size of the first seat portion) is smaller than the outside diameter D2 of the shaft main body 186a (an example of the maximum outer size of the shaft main body). Since the center line C1 of the shaft main body 186a substantially coincides with the center line C2 of the first seat portion 506b, the first seat portion 506b is disposed within the range of the outer shape of the shaft main body 186a when viewed from the optical axis direction, as shown in FIG. 8. In other words, when viewed from the optical axis direction, the first seat portion 506b does not stick out beyond of the range of the outer shape of the shaft main body 186a. Therefore, when the first bearing portion 501a approaches the master flange 240, the first seat portion 506b does not interfere with the first bearing portion 501a, and the first bearing portion 501a can move not only in the region on the outer peripheral side of the shaft main body 186a, but also in the region on the outer peripheral side of the first seat portion 506a.

Similarly, the outside diameter D3 of the second seat portion 507b (an example of the maximum outer size of the second seat portion) is smaller than the outside diameter D2 of the shaft main body 186a. Since the center line C1 of the shaft main body 186a substantially coincides with the center line C3 of the second seat portion 507b, the second seat portion 507b is disposed within the range of the outer shape of the shaft main body 186a when viewed from the optical axis direction, as shown in FIG. 9. In other words, when viewed from the optical axis direction, the second seat portion 507b does not stick out beyond of the range of the outer shape of the shaft main body 186a. Therefore, when the second bearing portion 501b approaches the fixing frame 230, the second seat portion 507b does not interfere with the second bearing portion 501b, and the second bearing portion 501b can move not only in the region on the outer peripheral side of the shaft main body 186a, but also in the region on the outer peripheral side of the second seat portion 507b.

Thus, the guide portion 501 of the third lens frame 130c is movable in the optical axis direction within the region from the first limiting face 506c of the master flange 240 to the second limiting face 507c of the fixing frame 230.

Features of Lens Barrel (1) As described above, with the lens barrel 100, since the first seat portion 506b is disposed within the range of the outer shape of the shaft main body 186a when viewed from the optical axis direction, the first bearing portion 501a is movable to the region on the outer peripheral side of the first seat portion 506b. Therefore, a wide movable range can be ensured for the third lens frame 130c, while still reducing the size of the lens barrel 100.

Similarly, since the second seat portion 507b is disposed within the range of the outer shape of the shaft main body 186a when viewed from the optical axis direction, the second bearing portion 501b can move to the region on the outer peripheral side of the second seat portion 507b. Therefore, a wide movable range can be ensured for the third lens frame 130c while also reducing the size of the lens barrel 100.

(2) Since the outside diameter D1 of the first seat portion 506b is smaller than the outside diameter D2 of the shaft main body 186a, even if there should be size error in the shaft main body 186a and the first seat portion 506b, the first seat portion 506b can still be disposed properly within the range of the outer shape of the shaft main body 186a. Also, since the outside diameter D3 of the first seat portion 506b is smaller than the outside diameter D2 of the shaft main body 186a, even if there should be size error in the shaft main body 186a and the second seat portion 507b, the second seat portion 507b can still be disposed properly within the range of the outer shape of the shaft main body 186a.

(3) Since the first fixed portion 186b of the guide shaft 186 is inserted into the first support hole 506a, it is easier to fix the guide shaft 186 to the first seat portion 506b, and the fixing strength of the guide shaft 186 can be increased. Also, since the first support hole 506a passes through the first seat portion 506b and the plate portion 241 in the optical axis direction, the length of the first fixed portion 186b can be set longer, and the fixing strength of the guide shaft 186 can be further increased.

Similarly, since the second fixed portion 186c of the guide shaft 186 is inserted into the second support hole 507a, it is easier to fix the guide shaft 186 to the second seat portion 507b, and the fixing strength of the guide shaft 186 can be increased. Also, since the second support hole 507a passes through the second seat portion 507b and the annular portion 231 in the optical axis direction, the length of the second fixed portion 186c can be set longer, and the fixing strength of the guide shaft 186 can be further increased.

(4) Since the size H1 of the first bearing portion 501a in the optical axis direction (the size of the first sliding hole 501c in the optical axis direction) is greater than the size H2 of the first seat portion 506b in the optical axis direction, even if the first bearing portion 501a moves in the optical axis direction and reaches the outer peripheral side of the first seat portion 506b, a state can still be maintained in which part of the first bearing portion 501a is able to slide with the shaft main body 186a. Therefore, the first bearing portion 501a can be prevented from fitting into the first seat portion 506b and catching on the shaft main body 186a.

Similarly, since the size H3 of the second bearing portion 501b in the optical axis direction (the size of the second sliding hole 501d in the optical axis direction) is greater than the size H4 of the second seat portion 507b in the optical axis direction, even if the second bearing portion 501b moves in the optical axis direction and reaches the outer peripheral side of the second seat portion 507b, a state can still be maintained in which part of the second bearing portion 501b is able to slide with the shaft main body 186a. Therefore, the 510b can be prevented from fitting into the second seat portion 507b and catching on the shaft main body 186a.

(5) Since the third lens frame 130c has the first bearing portion 501a and the second bearing portion 501b that are disposed away from it in the optical axis direction, looseness between the guide portion 501 and the guide shaft 186 can be suppressed, and the drive state of the third lens frame 130c can be stabilized.

Other Embodiments

Embodiments of the present invention are not limited to the above embodiment, and various modifications and changes are possible without departing from the gist of the present invention. Also, the above embodiment is fundamentally a preferred example, and is not intended to limit the scope of the present invention, or its applications, or the range of its applications.

Any components having substantially the same function as in the above embodiment are numbered the same, and will not be described again in detail.

(1) In the above embodiment, as long as the first seat portion 506b is disposed within the range of the outer shape of the shaft main body 186a when viewed from the optical axis direction, the shape of the first seat portion 506b is not limited to the shape discussed above. For example, the outside diameter D1 of the first seat portion 506b may be the same as the outside diameter D2 of the shaft main body 186a. Also, the shape of the first seat portion 506b need not be that of a circular cylinder, and may just be substantially tubular. Therefore, part of the outer periphery of the first seat portion 506b may be cut along a plane, or the outer shape of the first seat portion 506b may be polyhedral. The phrase "the first seat portion is disposed within the range of the outer shape of the shaft main body when viewed from the optical axis direction" as used here also encompasses a state in which the outer shape of the first seat portion coincides with the outer shape of the shaft main body.

Similarly, as long as the second seat portion 507b is disposed within the range of the outer shape of the shaft main body 186a when viewed from the optical axis direction, the shape of the second seat portion 507b is not limited to the shape discussed above. For example, the outside diameter D3 of the second seat portion 507b may be the same as the outside diameter D2 of the shaft main body 186a. Also, the shape of the second seat portion 507b need not be that of a circular cylinder, and may just be substantially tubular. Therefore, part of the outer periphery of the second seat portion 507b may be cut along a plane, or the outer shape of the second seat portion 507b may be polyhedral. The phrase "the second seat portion is disposed within the range of the outer shape of the shaft main body when viewed from the optical axis direction" as used here also encompasses a state in which the outer shape of the second seat portion coincides with the outer shape of the shaft main body.

(2) The guide shaft 186 need not have the first fixed portion 186b or the second fixed portion 186c. For example, the guide shaft 186 may be constituted by the shaft main body 186a alone. In this case, the first end 186d of the shaft main body 186a is fixed by adhesive bonding or the like to the first seat portion 506b, and the second end 186e of the shaft main body 186a is fixed by adhesive bonding or the like to the second seat portion 507b. In this case, the first support hole 506a and the second support hole 507a can be omitted.

(3) In the above embodiment, the two ends of the guide shaft 186 are fixed to the first seat portion 506b and the second seat portion 507b, respectively, but the guide shaft 186 may be supported by just the first seat portion 506b or the second seat portion 507b, rather than both.

(4) The first support hole 506a passes through the first seat portion 506b and the plate portion 241, but the first support hole 506a need not be a through-hole. For example, the first support hole 506a may be formed by just the first seat portion 506b.

Similarly, the second support hole 507a passes through the second seat portion 507b and the annular portion 231, but the second support hole 507a need not be a through-hole. For example, the second support hole 507a may be formed by just the second seat portion 507b.

(5) In the above embodiment, a lens barrel was described in which a focus lens was used as an example of an optical element, but the above teachings can also be applied to a zoom lens frame or another such lens frame that is disposed movably in a particular direction.

Figure 10:
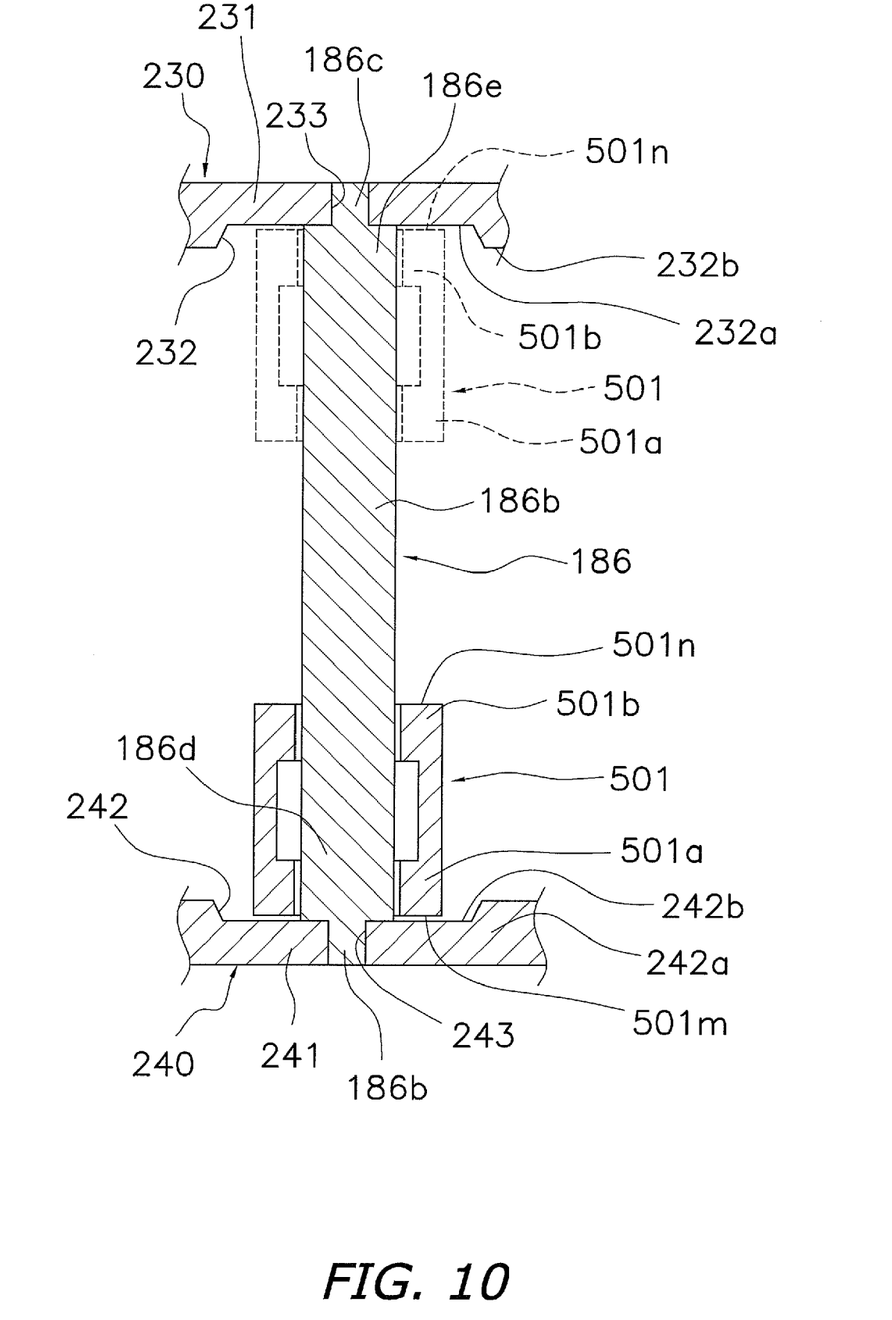
FIG. 10 is a cross section of a guide shaft and its surroundings (another embodiment)

(6) In the above embodiment, the movable range of the third lens frame 130c was expanded by reducing the outside diameter of the first seat portion 506b and the second seat portion 507b, but as shown in FIG. 10, the same effect as in the above embodiment can also be obtained when a recess in which the guide portion 501 is fitted is provided to the master flange 240 or the fixing frame 230.

More specifically, as shown in FIG. 10, the master flange 240 has a first recessed portion 242. A first support hole 243 is formed inside the first recessed portion 242. The first fixed portion 186b of the guide shaft 186 is press-fitted into the first support hole 243. The first recessed portion 242 is formed around the periphery of the first support hole 243, and is recessed in the optical axis direction. A first bottom face 242a is formed in the first recessed portion 242, and a first reference face 242b is formed farther to the outside than the first recessed portion 242. The first bottom face 242a is disposed at a position that is farther away from the first bearing portion 501a in the optical axis direction than the first reference face 242b. The first bearing portion 501a of the guide portion 501 can go into the first recessed portion 242. More precisely, a first end face 501m of the first bearing portion 501a can move closer to the first bottom face 242a than the first reference face 242b.

The fixing frame 230 has a second recessed portion 232. A second support hole 233 is formed in the second recessed portion 232. The second fixed portion 186c of the guide shaft 186 is press-fitted into the second support hole 233. The second recessed portion 232 is formed around the periphery of the second support hole 233, and is recessed in the optical axis direction. A second bottom face 232a is formed in the second recessed portion 232, and a second reference face 232b is formed farther to the outside than the second recessed portion 232. The second bottom face 232a is disposed at a position that is farther away from the second bearing portion 501b in the optical axis direction than the second reference face 232b. The second bearing portion 501b of the guide portion 501 can go into the second recessed portion 232. More precisely, a second end face 501n of the second bearing portion 501b can move closer to the second bottom face 232a than the second reference face 232b.

The same effect as with the above embodiment can also be obtained with this constitution.

Figure 11:
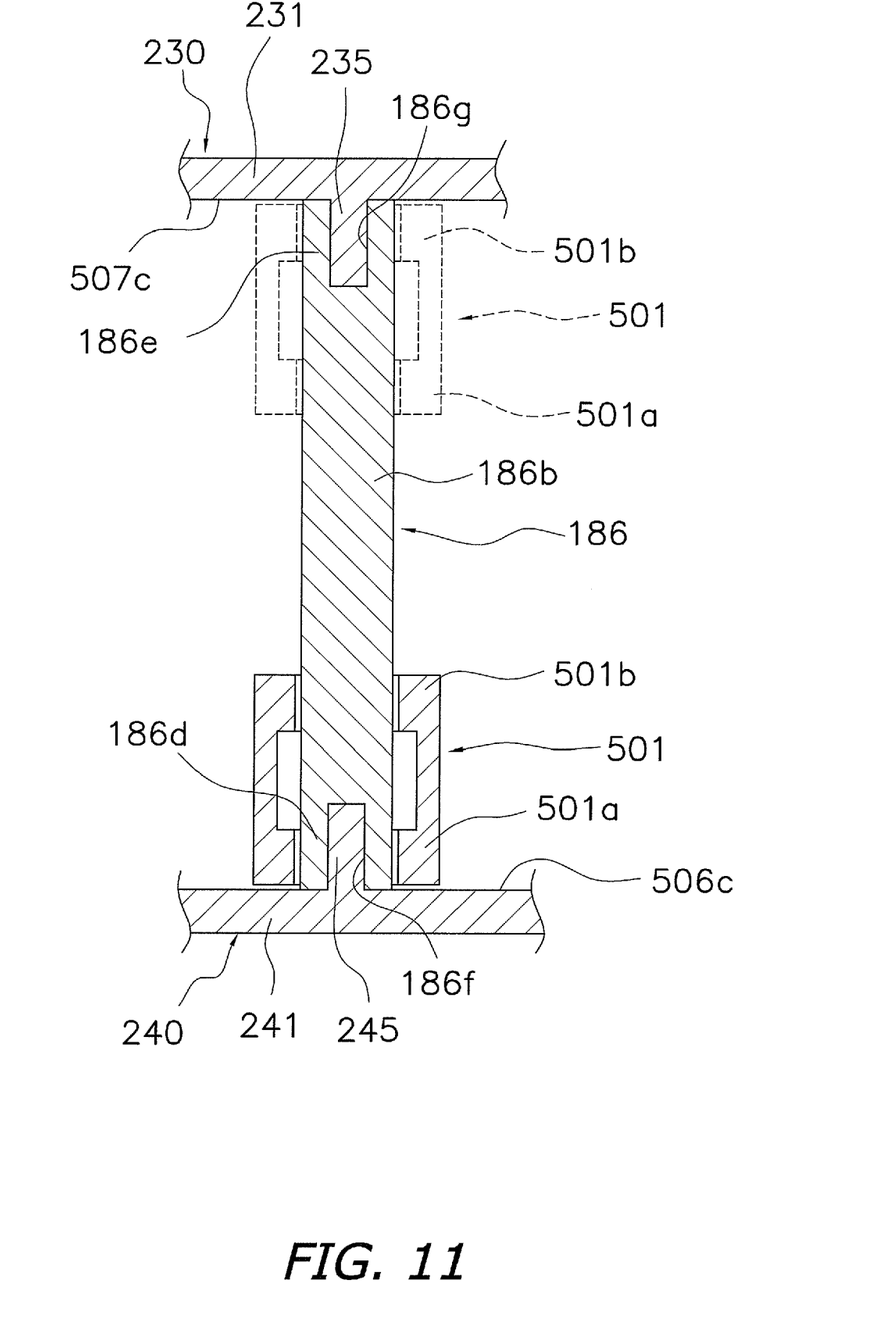
FIG. 11 is a cross section of a guide shaft and its surroundings (another embodiment).

(7) Also, a support hole may be formed in the guide shaft 186. More specifically, as shown in FIG. 11, the guide shaft 186 has only the shaft main body 186a, and does not have the first fixed portion 186b or the second fixed portion 186c. A first fixing hole 186f is formed in the first end 186d of the shaft main body 186a. A second fixing hole 186g is formed in the second end 186e of the shaft main body 186a.

Meanwhile, the master flange 240 has a first protrusion 245 that protrudes from the plate portion 241 in the optical axis direction. The first protrusion 245 is press-fitted to the first fixing hole 186f. The master flange 240 does not have the first seat portion 506b, and the first limiting face 506c of the plate portion 241 comes into contact with the first end 186d in the optical axis direction.

The fixing frame 230 has a second protrusion 235 that protrudes from the annular portion 231. The second protrusion 235 is press-fitted into the second fixing hole 186g. The fixing frame 230 does not have the second seat portion 507b, and the second limiting face 507c of the annular portion 231 comes into contact with the second end 186e in the optical axis direction.

The same effect as with the above embodiment can also be obtained with this constitution.

(8) The fixed lens barrel 110 is described in the above embodiment as an example of the first supporting frame, but the first supporting frame is not limited to the fixed lens barrel 110. For example, the first supporting frame can be made up of a plurality of members such as the fixed lens barrel 110, and also can be integrally formed as a one-piece unitary member. Also, the first supporting frame can include not only the fixed lens barrel 110 but also other members fixed to the fixed lens barrel 110. For example, the fixed lens barrel 110 can include the first base portion and the first seat portion, and the other member fixed to the fixed lens barrel 110 can include the second base portion and the second seat portion.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of an imaging device equipped with the lens barrel. Accordingly, these terms, as utilized to describe the present invention should be interpreted relative to an imaging device equipped with the lens barrel.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

What is claimed is:
1. A lens barrel comprising:
a first supporting frame including a first base portion and a first seat portion that projects from the first base portion in a first direction;
an optical element;
a second supporting frame configured to support the optical element and including a substantially tubular first bearing portion; and
a guide shaft fixed to the first seat portion and inserted into the first bearing portion,
the first seat portion being disposed within the circumference of the guide shaft when viewed in the first direction.
2. The lens barrel according to claim 1, wherein
the guide shaft includes a shaft main body inserted into the first bearing portion, and
the first base portion is disposed within the circumference of the shaft main body when viewed in the first direction.
3. The lens barrel according to claim 2, wherein
the outer peripheral side of the first seat portion is smaller than or substantially the same as the outer peripheral side of the shaft main body.
4. The lens barrel according to claim 2, wherein
the first supporting frame further includes a first support hole formed in at least the first seat portion, and
the guide shaft further includes a first fixed portion projecting from a first end of the shaft main body and inserted into the first support hole.
5. The lens barrel according to claim 4, wherein
the first support hole passes through the first seat portion and the first base portion in the direction of the first direction.

6. The lens barrel according to claim 4, wherein
the size of the first fixed portion in the first direction is substantially the same as the size of the first support hole in the first direction.

7. The lens barrel according to claim 2, wherein
the first supporting frame further includes a second base portion that is fixed to the first base portion and a second seat portion that projects from the second base portion toward the first seat portion in the first direction, the first supporting frame is disposed spaced apart from the first base portion in the first direction and the second seat portion is disposed spaced apart from the first seat portion in the first direction, and
the guide shaft is fixed to the first seat portion and the second seat portion.

8. The lens barrel according to claim 7, wherein
the second seat portion is disposed within the circumference of the guide shaft when viewed in the first direction.

9. The lens barrel according to claim 7, wherein
the outer peripheral side of the second seat portion is smaller or substantially the same as the outer peripheral side of the shaft main body.

10. The lens barrel according to claim 7, wherein
the first supporting frame further includes a second support hole formed in at least the second seat portion, and
the guide shaft further includes a second fixed portion projecting from a second end of the shaft main body and inserted into the second support hole.

11. The lens barrel according to claim 10, wherein
the second support hole passes through the second seat portion and the second base portion in the direction of the first direction.

12. The lens barrel according to claim 10, wherein
the size of the second fixed portion in the first direction is substantially the same as the size of the second support hole in the first direction.

13. The lens barrel according to claim 7, wherein
the second supporting frame further includes a substantially tubular second bearing portion disposed closer to the second seat portion than the first bearing portion, and
the guide shaft is inserted into the first bearing portion and the second bearing portion.

14. The lens barrel according to claim 13, wherein
the length of the second bearing portion in the first direction is greater than the length of the second seat portion in the first direction.

15. The lens barrel according to claim 14, wherein
the second bearing portion further includes a second sliding hole into which the guide shaft is inserted, and
the length of the second sliding hole in the first direction is greater than the length of the second seat portion in the first direction.

16. The lens barrel according to claim 1, wherein
the length of the first bearing portion in the first direction is greater than the length of the first seat portion in the first direction.

17. The lens barrel according to claim 16, wherein
the first bearing portion further includes a first sliding hole into which the guide shaft is inserted, and
the length of the first sliding hole in the first direction is greater than the length of the first seat portion in the first direction.

18. An imaging device comprising the lens barrel according to claim 1.

19. A lens barrel comprising:
a first supporting frame including a first recessed portion;
an optical element;
a second supporting frame configured to support the optical element and including a substantially tubular guide portion; and
a guide shaft inserted into the guide portion and fixed to the first recessed portion of the first supporting frame,
at least part of the guide portion being arranged to go into the first recessed portion.

20. The lens barrel according to claim 19, wherein
the first supporting frame further includes a first support hole disposed in the first recessed portion.

21. The lens barrel according to claim 20, wherein
the guide shaft includes a shaft main body inserted into the guide portion and a first fixed portion projecting from the shaft main body and inserted into the first support hole.

22. The lens barrel according to claim 21, wherein
the first supporting frame further includes a second recessed portion disposed spaced apart from the first recessed portion,
the guide shaft is fixed to the second recessed portion, and
at least part of the guide portion is arranged to go into the second recessed portion.

23. The lens barrel according to claim 22, wherein
the first supporting frame further includes a second support hole formed in the second recessed portion, and
the guide shaft further includes a second fixed portion protruding from the shaft main body and inserted into the second support hole.

24. A lens barrel comprising:
a first supporting frame having a first base portion and a first protrusion extending from the first base portion;
an optical element;
a second supporting frame configured to support the optical element and having a substantially tubular guide portion; and
a guide shaft defining a first fixing hole with an opening to accommodate the first protrusion, the guide shaft being inserted into the guide portion.

25. The lens barrel according to claim 24, wherein
the guide portion is movably disposed along the outer peripheral side of the first protrusion.

26. The lens barrel according to claim 24, wherein
the first supporting frame further has a second base portion fixed to the first base portion and a second protrusion projecting from the second base portion toward the first protrusion, the first supporting frame is disposed spaced apart from the first base portion, and
the guide shaft is disposed between the first and second base portions and further defines a second fixing hole with an opening into which the second protrusion is inserted.

27. The lens barrel according to claim 26, wherein
the guide portion is movably disposed along the outer peripheral side of the second protrusion.

* * * * *